Figures 1, 2, 3:
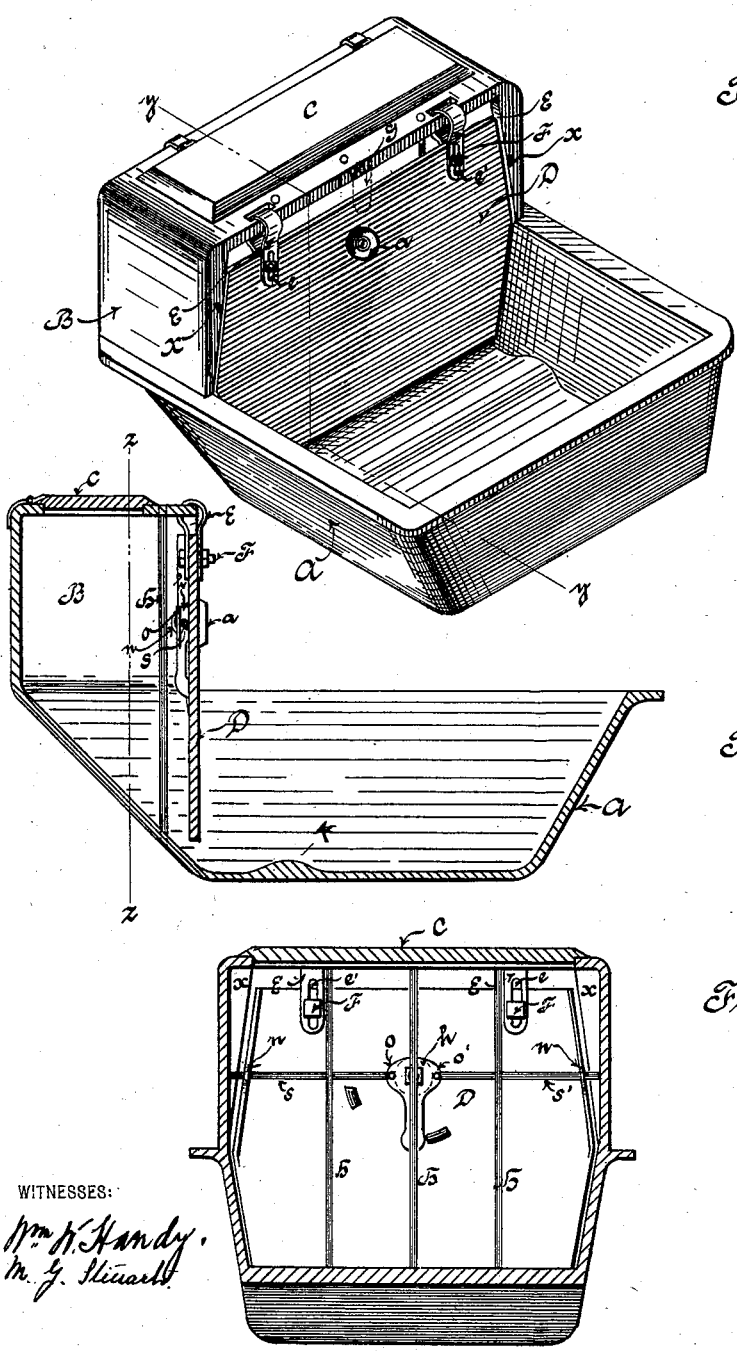

(No Model.)

H. STILL.
ANIMAL FEED BOX.

No. 592,262. Patented Oct. 26, 1897.

WITNESSES:
Wm. K. Handy.
M. G. Stewart.

INVENTOR
Henry Still

UNITED STATES PATENT OFFICE.

HENRY STILL, OF BALTIMORE, MARYLAND.

ANIMAL FEED-BOX.

SPECIFICATION forming part of Letters Patent No. 592,262, dated October 26, 1897.

Application filed April 13, 1895. Serial No. 545,664. (No model.)

*To all whom it may concern:*

Be it known that I, HENRY STILL, a citizen of the United States, and a resident of the city of Baltimore, in the State of Maryland, have invented new and useful Improvements in Animal Feed-Boxes; and I do declare that the following is a full, clear, and exact description of the invention, which will enable others skilled in the art to which it pertains to make and use the same, reference being had to the accompanying drawings, which are illustrations of the feed-box constructed in accordance with my invention.

The object of my invention is to prevent the waste of feed; to prevent animals from choking themselves while feeding; to regulate the ravenous feeder, thereby preventing acute disorders arising from hasty eating, and to construct a feed-box that will permit all kinds of feed, grain ground or unground, soft or cut feed, and hay to be fed from the same box and with the good effects above stated.

Similar letters refer to similar parts of the several views.

In the accompanying drawings, forming a part of this specification, Figure 1 is a perspective view of my improved feed-box. Fig. 2 is a vertical longitudinal section on line $y\ y$, Fig. 1. Fig. 3 is a transverse vertical section on line $z\ z$, Fig. 2, looking forward.

In carrying out my invention I employ a feed box or receptacle A and the hopper B at the rear end of said feed-box, the said hopper being inclined at an angle of forty-five degrees to the bottom of the feed-box, whereby the feed or grain held within said hopper will be guided out into the feed-box. The hopper is open at the top and provided with a suitable door C. The hopper is likewise opened at the front and is provided with a vertical adjustable swinging door D. Door D is suspended upon bearings at the upper front face of the hopper B by means of hangers E, said hangers E being formed, preferably, of metal bent over said bearings, having depending arms which clasp the upper part of door D, and having longitudinal slots $e\ e'$ cut in said arms so clasping door D, through which slots and corresponding holes in door D bolts are inserted having nuts upon their inner ends, whereby said door is held in desired positions, by and through which pass the bolts F, and by means of these slots and bolts the door can be adjusted at various heights from the bottom of the feed-box in order to accommodate coarse or fine feed.

The button G is pivoted to the front edge of the hopper and is adapted to be turned down in front of the door and hold the same in a locked position while filling the hopper, or in lieu of said button G (shown by dotted line in Fig. 1) the same result, and preferably, may be attained by the use of rods $s\ s'$ to thrust in and out of arms $o\ o'$, projecting from hub $h$ through the door D, near its center, the outer ends of said rods catching behind lugs or flanges $x\ x'$ at either side of said hopper B, said rods $s\ s'$ being supported at the outer edges of said door D by means of loops $n\ n'$, the depending portion of said hub $h$ tending to maintain rods $s\ s'$ in their thrust outwardly behind said lugs or flanges $n\ n'$, thereby preventing any forward movement of said door D beyond a perpendicular, yet permitting the same to have a limited motion inwardly toward said inclined rear side. To open door D, the rods $s\ s'$ are withdrawn from behind said lugs or flanges $n\ n'$ by turning arms $o\ o'$ by means of that part of hub $h$ projecting upon the front side of said door D.

In order to adapt my feed-box to the accommodation of hay, either cut or uncut, and to prevent the animal from wasting such hay out of the sides of the box, I provide a vertical bar or bars H, which are arranged in the rear of door D and extend from the front of the hopper down through the inclined rear side. The distance of said bar or bars $s\ s'$ to the rear of door D must be such as to allow a limited motion of said door inwardly toward said inclined rear side.

The bottom of a feed-box is provided with a transverse ridge or corrugation K, about an inch in height and extending entirely across said bottom, the purpose of said ridge or corrugation being to limit the amount of small feed which shall be fed from the hopper, and thus prevent the animal eating too fast and gorging itself. This ridge, it will be understood, acts in conjunction with the vertically-adjustable door to effect this aim. When hay is being fed, the door will be raised and thrown back from the top of the hopper, but when small feed is in the hopper, such as will readily feed out beneath the door, said door is swung down to the position shown in the drawings.

By means of a feed-box constructed as herein described it will be impossible for the horse to eat too rapidly, and, furthermore, it will be impossible for the animal to waste any of the food. Said box is therefore a great advantage to both the animal and owner. By having the door hinged the food is caused to feed automatically, as the horse in search of food will push the lower end of the door inwardly, and then as he takes his nose away the door swings back or outwardly, and thus leaves a vacant space, which is immediately filled by the grain feeding down to fill the vacant space.

This box is preferably constructed of metal, but it is obvious that it can be constructed of any suitable material; and it is also well understood that the size of said box can be varied as desired without departing from the spirit of the invention.

Having thus described my invention, what I claim is—

1. In a feed-box, the combination with the box or receptacle of the hopper open at the top, and having an inclined rear side leading to the bottom of the box or receptacle, the vertically-adjustable and swinging door at the forward side of said hopper, the vertical bars providing a rack substantially as shown and described.

2. The combination of a feed-box and hopper, said hopper having an inclined rear wall, leading to the bottom of the box, a swinging door suspended from the front edge of the hopper and separating the hopper and feed-box and having a locking and unlocking device adapted to permit the door to swing through a desired angle when locked and be opened to a horizontal or reversed position when unlocked, substantially as described.

3. The combination of a feed-box, and a feed-hopper separated by a bar and a swinging shutter, suspended between the box and hopper and on the box side of the bar.

HENRY STILL.

Witnesses:
ROWLAND HILL,
HERMON L. EMMON, Jr.